(12) United States Patent
Friedman et al.

(10) Patent No.: US 6,986,058 B1
(45) Date of Patent: Jan. 10, 2006

(54) METHOD AND SYSTEM FOR PROVIDING DATA SECURITY USING FILE SPOOFING

(75) Inventors: George Friedman, Austin, TX (US); Robert Phillip Starek, Austin, TX (US); Carlos A. Murdock, Austin, TX (US)

(73) Assignee: Infraworks Corporation, TX (US)

( * ) Notice: Subject to any disclaimer, the term of this patent is extended or adjusted under 35 U.S.C. 154(b) by 765 days.

(21) Appl. No.: 09/701,154

(22) PCT Filed: Sep. 29, 2000

(86) PCT No.: PCT/US00/26858

§ 371 (c)(1),
(2), (4) Date: Nov. 22, 2000

(87) PCT Pub. No.: WO01/25922

PCT Pub. Date: Apr. 12, 2001

Related U.S. Application Data

(60) Provisional application No. 60/157,472, filed on Oct. 1, 1999, and provisional application No. 60/206,947, filed on May 25, 2000.

(51) Int. Cl.
*H04L 9/00* (2006.01)

(52) U.S. Cl. ...................................... 713/200; 713/201

(58) Field of Classification Search ......... 713/200–201, 713/189, 193, 165–166; 707/1, 3, 9, 10, 200; 709/200–201, 217, 229
See application file for complete search history.

(56) References Cited

U.S. PATENT DOCUMENTS

| | | | | |
|---|---|---|---|---|
| 4,887,204 A | * | 12/1989 | Johnson et al. | 707/10 |
| 5,287,453 A | * | 2/1994 | Roberts | 709/201 |
| 5,584,023 A | * | 12/1996 | Hsu | 707/204 |
| 5,689,701 A | * | 11/1997 | Ault et al. | 707/10 |
| 5,694,580 A | | 12/1997 | Narita et al. | 395/500 |
| 5,892,903 A | | 4/1999 | Klaus | 395/187.01 |
| 5,931,947 A | | 8/1999 | Burns et al. | 713/201 |
| 6,324,581 B1 | * | 11/2001 | Xu et al. | 709/229 |

* cited by examiner

*Primary Examiner*—Hosuk Song
(74) *Attorney, Agent, or Firm*—DLA Piper Rudnick LLP

(57) ABSTRACT

A method for providing data security in a device driver for accessing data. The device driver detects a file system request, completes the file system request, and receives return information from the file system request. The device driver further determines whether the file system request is for a tag file associated with a secured file; and if so, modifies the return information to reflect a file attribute of the secured file.

34 Claims, 3 Drawing Sheets

METHOD AND SYSTEM FOR PROVIDING DATA SECURITY USING FILE SPOOFING

This application is a U.S. National Stage application of PCT International Application No. PCT/US00/26858 filed Sep. 29, 2000 which claims priority to provisional application 60/157,472 filed Oct. 1, 1999 and provisional application 60/206,947 filed May 25, 2000.

FIELD OF THE INVENTION

The present invention pertains to the field of file systems in electronic computers. In particular, the invention relates to a method and system for providing data security using file spoofing.

BACKGROUND OF THE INVENTION

Data security is a serious concern of computer users and owners of intellectual property. It is increasingly common to use measures such as encryption to secure data files, to protect data from loss or unauthorized activity.

Computer systems typically include one or more local or networked data storage devices. A typical application program executing on such a computer system, accesses such data storage devices by calling standard file system services provided by an operating system, such as services for creating, reading, and writing files on the data storage devices.

A device driver is a set of computer-implemented instructions that implements the device-specific aspects of generic input/output operations. In typical operating systems, software applications such as device drivers run in either "kernel mode" or "user mode." A virtual device driver is a type of device driver that has direct access to an operating system kernel, such as by running in kernel mode. "Kernel mode" is a highly privileged memory access mode of the processor. "User mode" is a less privileged memory access mode of the processor. The memory access mode is a part of the hardware state of the processor. The kernel mode privilege level is also known as "Ring 0," and the user mode privilege level is also known as "Ring 3." Kernel mode access allows the virtual device driver to interact with system and hardware resources at a very low level.

In conventional operating systems, device drivers may be represented as layered on top of one another. The layered architecture is also sometimes referred to as a stack or a calling chain. It is the lowest-level device driver that typically controls a hardware device. If there is only a single device driver above the hardware device, the driver is called a monolithic driver.

However, a plurality of drivers may be placed above the lowest-level driver. Input and output requests ("I/O requests") to the hardware device or devices controlled by a lowest-level driver are handled first by the highest-level driver, then seriatim by any lower-level intermediate drivers, and finally by the lowest-level driver.

A file system driver is generally a highest-level driver, layered above a device driver for a data storage device such as a hard disk drive. The file system driver implements high-level aspects of I/O requests directed to the file system, such as requests to create, open, extend, and delete files and directories. A plurality of file system drivers may exist in a single computer, and file system drivers may be specific to different types of file systems, such as the FAT and NTFS file systems.

It is known in the art to monitor file I/O requests in operating systems having an installable file system manager and layered device drivers, such as the Windows 95®, Windows 98®, and Windows Me® operating systems available from Microsoft Corporation of Redmond, Wash., and collectively referred to herein as "Windows 9x". In Windows 9x operating systems, file system monitoring may be accomplished by registering a file system applications programing interface hook with the installable file system manager. Windows 9x provides a function called IFSMGR_InstallFileSystemApiHook which is designed to be used for monitoring I/O requests to a file system. This service allows virtual device drivers to monitor all file system activity by hooking into the file system calls. By means of a call during system initialization to IFSMGR_InstallFileSystemApiHook, a virtual device driver may insert itself onto the stack of all file system requests.

A somewhat different approach has been used to monitor file systems on object-oriented operating systems, such as the Windows NT® operating system and successor operating systems such as Windows 2000®, available from Microsoft Corporation of Redmond, Wash., and collectively referred to herein as "Windows NT." In Windows NT, I/O requests are described by data structures known as I/O Request Packets ("IRPs"), which are used for communication between software applications and drivers. All IRPs to hardware devices are handled by device drivers operating in kernel mode. High-level, intermediate, and low-level drivers exchange IRPs to complete a given I/O request. The lowest-level driver calls an NT layer known as the Hardware Access Layer (HAL) to gain direct control of the hardware. It is known on a Windows NT system to implement a file system monitor as a device driver object that creates filter device objects and attaches those objects to target file system device objects, so that the file system monitor will see all IRPs directed to the monitored data storage devices.

It is known to store secured files, such as encrypted files, alongside unsecured files in the same file system. The encrypted file appears in the file directory like any other file, with relevant file attributes such as name and size. However, the data contained in the file is unintelligible to user applications until decrypted. Furthermore, the encryption process is likely to result in the size of the file becoming larger or smaller than the original unencrypted data. In such a case, a request to the file system to determine the file size would not reliably return the actual size of the original data. From the user's point of view, this type of data security lacks the desirable feature of transparency.

It is also known to store secured files in a special physical or virtual location apart from the ordinary file system. Such locations may include remote networked devices, encrypted or password-protected file systems, or other virtual secured file systems. This type of data security prevents the user from freely intermingling secured and unsecured files in a single file directory, even though the files may be logically related to one another. Although a user may set up, in the unsecured directory, symbolic links or shortcuts to secured files in another location, such an exercise for authorized persons adds an undesirable layer of obfuscation and effort to the process of conveniently accessing secured data

SUMMARY OF THE INVENTION

It is a principal object of the present invention to provide a more convenient way for users to obtain information in connection with secured data files or file systems.

Another object of the present invention is to prevent unauthorized device drivers from obtaining information in connection with secured data files or file systems.

These and other objects are provided by a method and system for providing data security using file spoofing.

More particularly, the present invention relates to a method for providing data security in a device driver for accessing data. The device driver detects a file system request, completes the file system request, and receives return information from the file system request. The device driver further determines whether the file system request is for a tag file associated with a secured file; and if so, modifies the return information to reflect a file attribute of the secured file.

In another aspect, the invention relates to a system for providing data security, the system comprising a device driver for accessing data. The device driver is operably installed in an operating system on an electronic computer. The device driver detects a file system request, completes the file system request, receives return information from the file system request, determines whether the file system request is for a tag file associated with a secured file; and if so, modifies the return information to reflect a file attribute of the secured file.

In still another aspect, the invention comprises a machine-readable medium comprising a device driver program for accessing data. In yet another aspect, the invention comprises a computer-implemented device driver for accessing data.

Further objects and advantages of this invention will become apparent from the detailed description of a preferred embodiment, which follows.

BRIEF DESCRIPTION OF THE DRAWINGS

The present invention is described in further detail with reference to the accompanying drawings. The figures of the accompanying drawings illustrate the present invention by way of example and not limitation.

DETAILED DESCRIPTION OF PREFERRED EMBODIMENTS OF THE INVENTION

The invention will be understood more fully from the detailed description given below; which, however, should not be taken to limit the invention to a specific embodiment, but is for explanation and understanding only.

The terms "computer" or "computer system," as used herein, include any device capable of receiving, transmitting, and/or using information, including, without limitation, a processor, a microprocessor, a personal computer, such as a laptop, palm PC, desktop or workstation; a network server; a mainframe; an electronic wired or wireless device, such as for example, a telephone; an interactive television or electronic box attached to a television, such as for example, a television adapted to be connected to the Internet; a cellular telephone; a personal digital assistant; an electronic pager, and a digital watch. In an illustrative example, information is transmitted in the form of e-mail. A computer, computer system, or system of the invention may operate in communication with other systems over a network, such as, for example, the Internet, an intranet, or an extranet, or may operate as a stand-alone system.

It should also be understood that the terms "device driver" or "driver," as used herein, include any computer-implemented instructions for directly or indirectly accessing or controlling hardware devices, including, without limitation, device drivers, virtual device drivers (VxDs), instructions using NT kernel mode architecture, instructions using Win32 driver model (WDM), and other instructions, in any computer language, directed to any computer, computer architecture, network, or operating system.

The terms "information" and "data" as used herein are each intended to include the broadest definition of the other, and each include text, audio and video data. By way of further example, the term "information" can mean raw data, processed data, or a combination of raw and processed data.

Although the embodiment illustrated in the figures comprises a device driver described for illustrative purposes as a "file system monitor," the term "file system monitor" as used herein refers generally to a device driver of any kind using the file spoofing of the present invention. Device drivers within the scope of the invention may perform any sort of useful function that may be performed by a device driver, including, without limitation, general-purpose monitoring, permission monitoring, filtering, encryption, decryption, virus detection, data mirroring, I/O functions directed toward any device, and other functions, and are not limited to either monitoring or to functions related to file systems. Any device driver which accomplishes file spoofing appropriately falls within the scope of the present invention.

Figure 1:
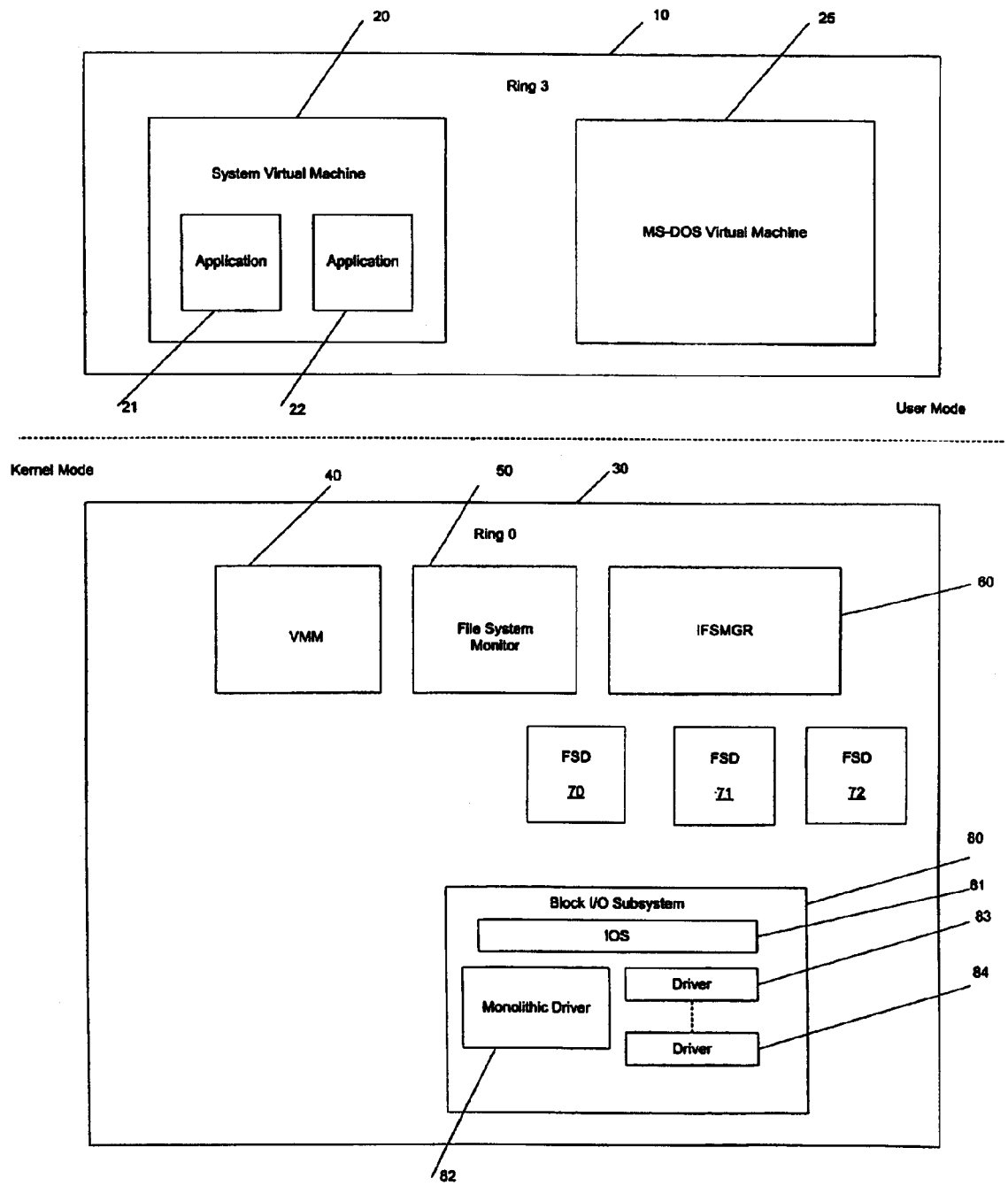
FIG. 1 is a diagram of the system architecture layout of the Windows 9x operating system.

One embodiment of the present invention may be implemented on a Windows 9x operating system. Referring now to FIG. 1, components of the Windows 9x operating system are divided between user mode code 10 and kernel mode code 30, which provide different levels of system protection. For one embodiment, the user mode code 10 includes a system virtual machine 20 capable of running 16-bit and 32-bit software applications 21–22, and a plurality of MS-DOS virtual machines 25. In this embodiment, the kernel mode code 30 comprises low-level operating system services and virtual device drivers, such as a virtual machine manager 40, a file system monitor 50 of the present invention, and an installable file system manager 60.

Beneath the installable file system manager 60 are a plurality of file system drivers 70–72 for file systems such as FAT and NTFS. Beneath the file system drivers 70–72 is a block I/O subsystem 80. The block I/O subsystem 80 includes an I/O supervisor 81 which manages requests as they pass through the file system hierarchy, a monolithic driver 82 for port I/O and a layered plurality of device drivers 83–84.

In this embodiment, the first device driver 50 intercepts all I/O requests from user mode code 10 and from applications 21–22 running in user mode 10, before the I/O requests are sent to the installable file system manager 60. The first device driver 50 is able to monitor and, if desired, filter all file system activity occurring in the installable file system manager 60, file system drivers 70–72, and block I/O subsystem 80. By means of a call during system initialization to IFSMGR_InstallFileSystemApiHook, the first device driver 50 is hooked into such calls when the operating system is started or restarted, at which time it is inserted into a functionally uppermost position on the stack of all file system requests. From the installable file system manager 60 down through each driver in the layered plurality 83–84, an I/O request is passed from the highest level to the lowest level, and the devices can also view the result of a request as it passes back up the stack to the source of the I/O request. Each device driver on the stack may service an I/O request itself and not pass the I/O request to lower levels, or may, if desired, itself generate a new I/O request Such device drivers may implement functions that require waiting, such as for an interrupt, or for a device to become available. During such waiting periods the device driver simply returns to its caller, allowing the calling application or device driver to perform other work in parallel with the I/O request. In the alternative, the calling application or device driver can simply wait ("block") until the I/O request is complete.

Figure 2:
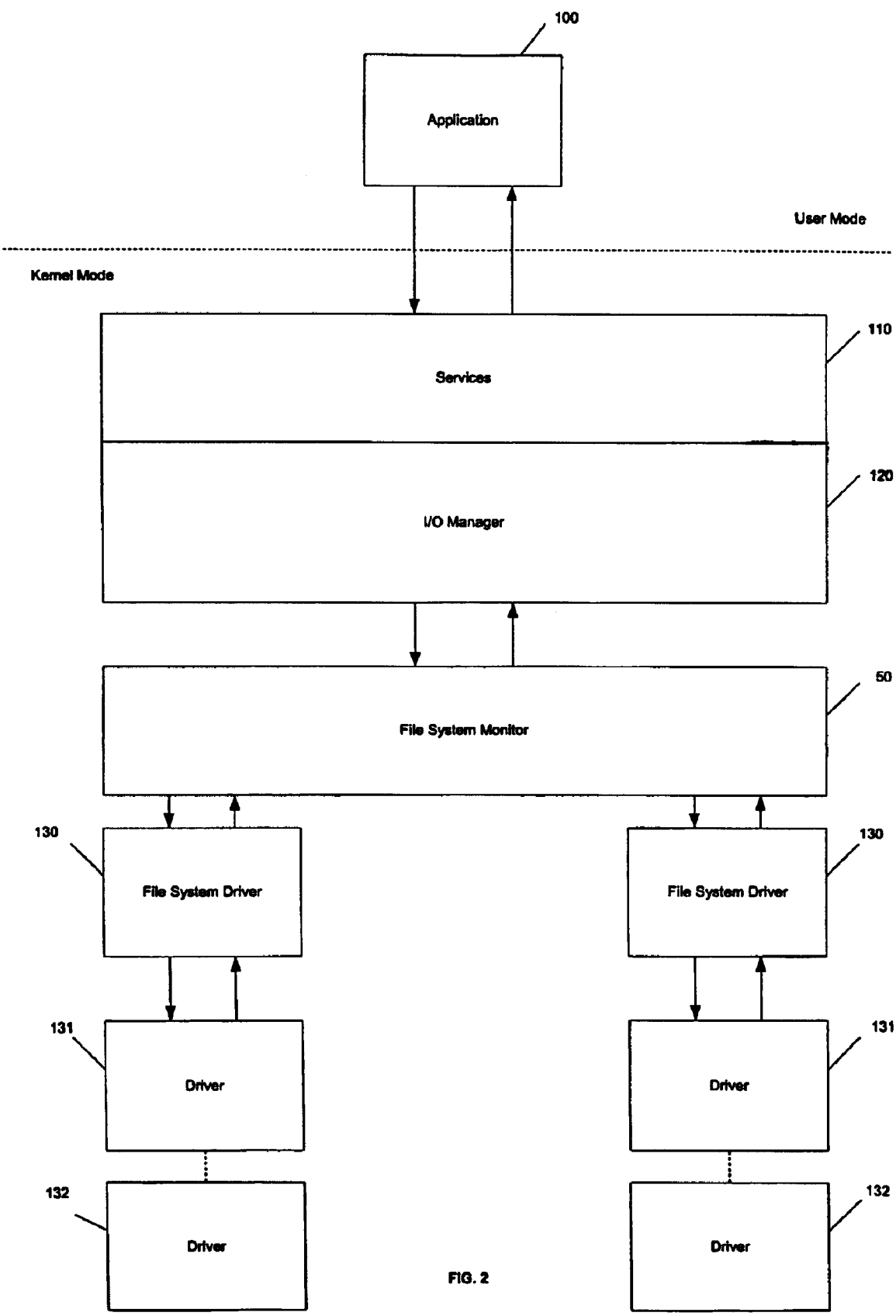
FIG. 2 is a diagram of the system architecture layout of the Windows NT operating system.

In another embodiment, illustrated with reference to FIG. 2, the present invention may be implemented on a Windows NT operating system. As is well known in the art, an application 100 running in user mode under Windows NT may send an I/O request to operating system services 110. I/O manager 120 receives I/O requests, and coordinates the transfer of I/O request packets among various drivers. In the alternative, the various drivers may communicate directly with each other without using an I/O manager 120 or other device to coordinate transfer of information among the various drivers.

The conventional input/output system of operating systems such as Windows NT comprises a plurality of device drivers 130–132 for processing I/O requests. Such device drivers are illustrated, for example, by file system drivers 130, and a layered plurality of device drivers Thereupon, the I/O manager 120 typically delivers I/O request packets to the file system driver 130 responsible for managing the target of the I/O request. However, as is known in the art, a file system monitor 50 can attach to other device drivers 130–132 in an object-oriented fashion. Thereupon, the I/O manager 120 routes I/O request packets intended for the target device driver 130–132 to the file system monitor 50 that has attached to the target device driver 130–132. In this illustrative embodiment, the file system monitor 50 attaches to each of the plurality of file system driver objects 130.

Figure 3:
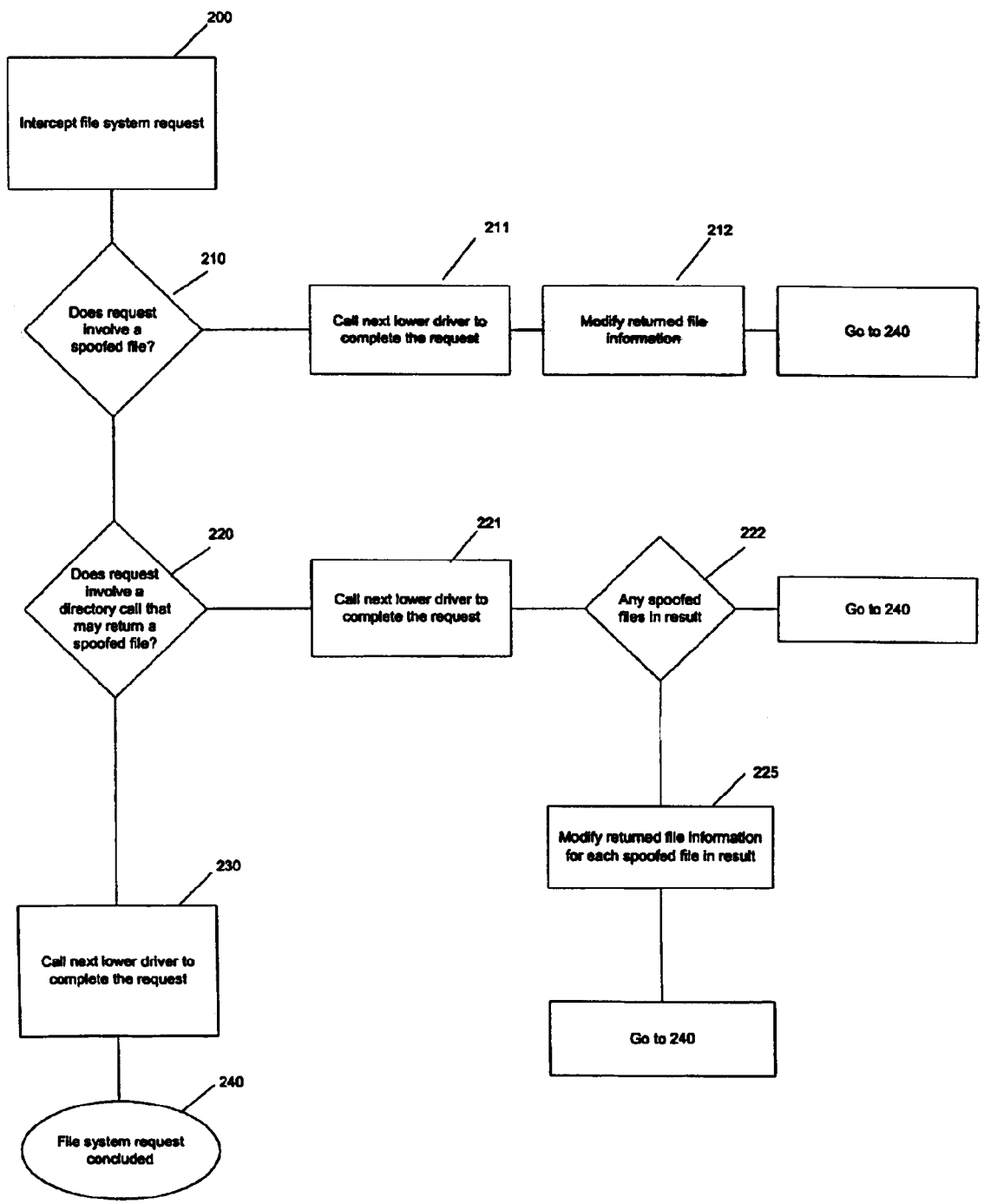
FIG. 3 is a flow chart illustrating an embodiment of the file spoofing method of the present invention.

FIG. 3 is a flow chart of one embodiment of a method for providing data security in a file system monitor 50 using file spoofing.

As shown in FIG. 3, the file spoofing process of the present invention is initiated, in step 200, each time a file system request is detected. In step 210, the process determines whether or not the file system request involves a spoofed file. The determination of step 210 is performed for any file system request that specifies a named file as the object of the request. Such file system requests include FILE_OPEN to open a file, FILE_DELETE to delete a file, and FILE_RENAME to rename a file. In the Windows NT operating systems, such file system requests also include FILEQUERY_INFORMATION to query file information, and FILE_SET_INFORMATION to set file information. Each of these calls requires a file name to be specified. In the determination of step 210, the specified file name is checked to determine whether the file is a spoofed file.

A spoofed file is a file which has been secured by placing the data in a secured file location where such data is not readily accessible to the user, such as, by way of illustration and not limitation, a secure or encrypted virtual file system, while maintaining a tag file in a user-accessible part of the file system to serve as a placeholder. To save disk space, the tag file may be zero bytes in length. In one embodiment, from the point of view of the user, the tag file transparently appears to contain the secured data, and the file spoofing process will enable any file system request to reach the secured file location.

To determine whether a file is a spoofed file, the process checks the file name against a database of all spoofed files, and if the file is a spoofed file, the process determines the secured file associated with the tag file. In an alternate embodiment, the process may rely on data stored in the tag file.

If the determination of step 210 is that the file request involves a spoofed file, the process continues at step 211 and completes the file system request. In one embodiment, the process calls the next lower driver to complete the file system request for the tag file. In an alternate embodiment, the process rewrites the file system request to refer to the secured file instead of the tag file, and calls the next lower driver to complete the file system request for the secured file.

The process continues at step 212 by modifying the information returned by the file system request. File attributes, such as file size, are part of the information returned by file system requests. The process removes selected file attributes of the tag file from the return information, and substitutes the corresponding file attributes of the secured file. For example, where the file size of a tag file is zero, the user will instead see the file size of the corresponding secured file.

The process then concludes at step 240.

Returning to step 210, if the determination of step 210 is that the file request does not involve a spoofed file, the process continues at step 220 and determines whether the file system request involves a directory call that may return a spoofed file. Such file system requests in Windows 9x include FIND_OPEN or FIND_FIRST to find a first matching file, and FIND_NEXT to find a next matching file. In the Windows NT operating systems, such file system requests include DIRECTORY_CONTROL, which provides a buffer of matching file names.

If the determination of step 220 is that the file system request involves a directory call that may return a spoofed file, the process continues at step 221 and completes the file system request. In one embodiment, the process calls the next lower driver to complete the file system request for the tag file. In an alternate embodiment, the process rewrites the file system request to refer to the secured file instead of the tag file, and calls the next lower driver to complete the file system request for the secured file.

The process continues at step 222 by determining whether the information returned by the file system request refers to any spoofed files. Requests to find a first matching file or a next matching file will each return a single file. A request to the Windows NT file system for directory control will return a buffer of file names, each of which must be considered. If no spoofed files are returned, the process concludes at step 240.

If any spoofed files are returned, the process continues at step 225 by modifying the information returned by the file system request. File attributes, such as file size, are part of the information returned by file system requests. The process removes selected file attributes of the tag file from the return information, and substitutes the corresponding file attributes of the secured file. For example, where the file size of a tag file is zero, the user will instead see the file size of the corresponding secured file. The process then concludes at step 240.

Returning to step 220, if the determination of step 220 is that the file system request does not involve a directory call that may return a spoofed file, the process continues at step 230 and completes the file system request, and concludes at step 240.

What have been described are only some examples of methods and systems according to the invention. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown. On the contrary, it is to be understood that various and numerous other arrangements may be devised by one skilled in the art without departing from the spirit and scope of the invention as limited only by the accompanying claims.

We claim:

1. A method for providing data security in a device driver for accessing data, the method comprising the steps of:

providing at least one tag file, the tag file comprising a physical file of zero bytes in length;

maintaining the tag file in a part of a file system; and processing file system calls so that the tag file appears as a secured file containing data from the viewpoint of a user, operating system and programs, the method further comprising the steps of:

detecting a file system request;

completing said file system request;

receiving return information from said file system request;

determining whether said file system request is for a tag file associated with a secured file; and if so, modifying said return information to reflect a file attribute of the secured file.

2. The method of claim 1 wherein said file attribute is file size.

3. The method of claim 1 wherein the step of determining further comprises the steps of:

determining whether said return information identifies a plurality of tag files associated with a plurality of secured files; and if so, modifying said return information to reflect a file attribute of the plurality of secured files.

4. The method of claim 1 wherein the secured file is stored in encrypted form.

5. The method of claim 1 wherein the secured file is stored in a secure virtual file system.

6. The method of claim 1 wherein the secured file is stored on a remote networked device.

7. The method of claim 1 wherein the file system request is to open a file.

8. The method of claim 1 wherein the file system request is to delete a file.

9. The method of claim 1 wherein the file system request is to rename a file.

10. The method of claim 1 wherein the file system request is to query file information.

11. The method of claim 1 wherein the file system request is to set file information.

12. The method of claim 3 wherein the file system request is to find a first matching file.

13. The method of claim 3 wherein the file system request is to find a next matching file.

14. The method of claim 3 wherein the file system request is directory control.

15. A system for providing data security, the system comprising a device driver for accessing data, the device driver operably installed in an operating system on an electronic computer, the system further comprising at least one tag file, the tag file comprising a physical file of zero bytes in length, the tag file being maintained in a file system location, wherein file system calls are processed so that the tag file appears as a secured file containing data, wherein said device driver:

detects a file system request;

completes said file system request;

receives return information from said file system request;

determines whether said file system request is for a tag file associated with a secured file; and if so, modifies said return information to reflect a file attribute of the secured file.

16. The system of claim 15 wherein said file attribute is file size.

17. The system of claim 15 wherein said device driver further determines whether said return information identifies a plurality of tag files associated with a plurality of secured files; and if so, modifies said return information to reflect a file attribute of the plurality of secured files.

18. The system of claim 15 wherein said first device driver is a file system monitor.

19. The system of claim 15 wherein the secured file is stored in encrypted form.

20. The system of claim 15 wherein the secured file is stored in a secure virtual file system.

21. The system of claim 15 wherein the secured file is stored on a remote networked device.

22. The system of claim 15 wherein the file system request is to open a file.

23. The system of claim 15 wherein the file system request is to delete a file.

24. The system of claim 15 wherein the file system request is to rename a file.

25. The system of claim 15 wherein the file system request is to query file information.

26. The system of claim 15 wherein the file system request is to set file information.

27. The system of claim 17 wherein the file system request is to find a first matching file.

28. The system of claim 17 wherein the file system request is to find a next matching file.

29. The system of claim 17 wherein the file system request is directory control.

30. A machine-readable medium comprising a device driver program for accessing data, said device driver program comprising:

computer implemented instructions for providing at least one tag file, the tag file comprising a physical file of zero bytes in length;

computer-implemented instructions for maintaining the tag file in a part of a file system;

computer-implemented instructions for processing file system calls so that the tag file appears as a secured file containing data from the viewpoint of a user;

computer-implemented instructions for detecting a file system request;

computer-implemented instructions for completing said file system request;

computer-implemented instructions for receiving return information from said file system request;

computer-implemented instructions for determining whether said file system request is for a tag file associated with a secured file; and computer-implemented instructions for modifying said return information to reflect a file attribute of the secured file, if said file system request is for a tag file associated with a secured file.

31. The machine-readable medium of claim 30 wherein the device driver program further comprises:

computer-implemented instructions for determining whether said return information identifies a plurality of tag files associated with a plurality of secured files; and computer-implemented instructions for modifying said return information to reflect a file attribute of the plurality of secured files, if said return information identifies a plurality of tag files associated with a plurality of secured files.

32. A computer-implemented device driver for accessing data when operably installed in a computer operating system, said device driver comprising:

means for providing at least one tag file, the tag file comprising a physical file of zero bytes in length;

means for maintaining the tag file in a part of a file system;

means for processing file system calls so that the tag file appears as a secured file containing data from the viewpoint of a user; means for detecting a file system request;

means for completing said file system request;

means for receiving return information from said file system request;

means for determining whether said file system request is for a tag file associated with a secured file; and means for modifying said return information to reflect a file attribute of the secured file, if said file system request is for a tag file associated with a secured file.

33. The computer-implemented device driver of claim 32 wherein said file attribute is file size.

34. The computer-implemented device driver of claim 32 further comprising:

means for determining whether said return information identifies a plurality of tag files associated with a plurality of secured files; and means for modifying said return information to reflect a file attribute of the plurality of secured files, if said return information identifies a plurality of tag files associated with a plurality of secured files.

\* \* \* \* \*

UNITED STATES PATENT AND TRADEMARK OFFICE
CERTIFICATE OF CORRECTION

| | | |
|---|---|---|
| PATENT NO. | : 6,986,058 B1 | Page 1 of 1 |
| APPLICATION NO. | : 09/701154 | |
| DATED | : January 10, 2006 | |
| INVENTOR(S) | : Friedman et al. | |

It is certified that error appears in the above-identified patent and that said Letters Patent is hereby corrected as shown below:

<u>In column 5</u>

Line 50, change "FILEQUERY" to --FILE QUERY--.

Signed and Sealed this

Fourth Day of July, 2006

JON W. DUDAS
*Director of the United States Patent and Trademark Office*